(12) United States Patent  
Chen et al.

(10) Patent No.: US 9,106,545 B2  
(45) Date of Patent: *Aug. 11, 2015

(54) HIERARCHICAL OCCUPANCY-BASED CONGESTION MANAGEMENT

(75) Inventors: Yiyu L. Chen, Rueschlikon (CH); Nikolaos I. Chrysos, Thalwil (CH); Rolf Clauberg, Gattikon (CH); Mircea R. Gusat, Langnau am Albis (CH); Cyriel J. Minkenberg, Gutenswil (CH); Fredy D. Neeser, Langnau am Albis (CH); Kenneth M. Valk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/330,441

(22) Filed: Dec. 19, 2011

(65) Prior Publication Data

US 2013/0155858 A1  Jun. 20, 2013

(51) Int. Cl.  
*G01R 31/08* (2006.01)  
*H04L 12/801* (2013.01)  
*H04L 12/835* (2013.01)

(52) U.S. Cl.  
CPC .............. *H04L 47/10* (2013.01); *H04L 47/30* (2013.01)

(58) Field of Classification Search  
CPC ....................................................... H04L 47/10  
See application file for complete search history.

(56) References Cited

U.S. PATENT DOCUMENTS

| | | | |
|---|---|---|---|
| 5,963,541 A * | 10/1999 | Koga et al. | 370/229 |
| 6,141,323 A | 10/2000 | Rusu et al. | |
| 7,369,498 B1 | 5/2008 | Ma et al. | |
| 7,480,304 B2 | 1/2009 | Yeh et al. | |
| 2001/0032269 A1 | 10/2001 | Wilson | |
| 2003/0174700 A1* | 9/2003 | Ofek et al. | 370/389 |
| 2006/0092840 A1* | 5/2006 | Kwan et al. | 370/230.1 |
| 2007/0064716 A1* | 3/2007 | Sachs et al. | 370/412 |
| 2009/0113069 A1 | 4/2009 | Prabhakar et al. | |

(Continued)

FOREIGN PATENT DOCUMENTS

EP  2575303 A1  4/2013

OTHER PUBLICATIONS

UK Combined Search and Examination Report Under Sections 17 and 18; International Application No. GB1221917.6; Date of Mailing: Apr. 17, 2013; 7 pages.

(Continued)

*Primary Examiner* — Samina Choudhry  
(74) *Attorney, Agent, or Firm* — Cantor Colburn LLP; Daniel Morris

(57) ABSTRACT

A method for hierarchical occupancy based congestion management includes receiving, by a computing device, a plurality of data flows, each of the plurality of data flows is received from a source and includes a plurality of data packets and storing the plurality of data packets in a buffer including multiple storage units. The method includes determining if the buffer is congested, responsive to determining the buffer is congested randomly selecting at least two occupied units of the buffer and identifying a source of each of the data packets stored in the occupied units of the buffer and generating a congestion notification message. The method also includes comparing a selection criterion associated with each identified source to determine which identified source has a higher selection criterion and sending the congestion notification message to the identified source with the higher selection criterion.

6 Claims, 8 Drawing Sheets

(56) References Cited

U.S. PATENT DOCUMENTS

| | | | |
|---|---|---|---|
| 2009/0268612 A1 | 10/2009 | Felderman et al. |
| 2009/0300209 A1 | 12/2009 | Elzur |
| 2010/0202294 A1 | 8/2010 | Mullendore et al. |
| 2010/0302941 A1 | 12/2010 | Prabhakar et al. |

OTHER PUBLICATIONS

Kabbani et al., "AF-QCN: Approximate Fairness with quantized Congestion Notification for Multi-tenanted Data Centers" 18th IEEE Symposium on High Performance Interconnects, Aug. 18-20, 2010, 8 pages.

Leung et al., "Effect of Dfferent Marking Strategies on Explicit Congestion Notification (ECN) performance", IEEE International Conference on Communications, ICC 2001, vol. 6, Jun. 2001, pp. 1812-1816.

Devkota et al., "Performance of Quantized Congestion Notification in TCP Incast Scenarios of Data Centers", MASCOTS 2010, IEEE International Symposium (Aug. 17-19, 2010), pp. 235-243 (Miami Beach).

Gusat et al., "Delay-Based Cloud Congestion Control", GLOBECOM 2009, IEEE Global Telecommunications Conference (2009), pp. 1-8.

Hadjadj Aoul et al., "Buffer Occupancy-Based CAC in Converged IP and Broadcasting Networks", Communications Society (2007), IEEE 2007, International Conference, ICC (Jun. 24-28, 2007), pp. 19-25, (Glasgow).

Hagen, "Data Center Bridging Tutorial", University of New Hampshire—InterOperabililty Laboratory (Feb. 2009), pp. 1-3.

Jiang et al., "An Explicit Rate Control Framework for Lossless Ethernet Operation", Communications (2008), ICC 2008, IEEE International Conference (May 19-23, 2008), pp. 5914-5918, (Beijing).

Wang et al., "Comparison of Adaptive Internet Multimedia Applications", IEICE Trans. Commun., (Jun. 1999) pp. 806-818, vol. E82-B, No. 6.

\* cited by examiner

HIERARCHICAL OCCUPANCY-BASED CONGESTION MANAGEMENT

BACKGROUND

The present disclosure relates to congestion management, and more specifically, to hierarchical occupancy based congestion management.

Server farms, also known as data centers, are becoming more and more utilized. Without proper congestion management, the increased network utilization will reduce the performance of applications that utilize these networks. Many data centers are using Converged Enhanced Ethernet (CEE) that allows high link speeds and short delays while introducing lossless operation beyond the lossy operation provided by traditional Ethernet.

Lossless CEE operation requires a distributed congestion management system with congestion detection at congestion points. In response to detecting congestion, the congestion points send congestion notification messages to traffic sources, which instruct the traffic sources to reduce their data transmission rate. Current congestion management schemes and congestion notification schemes are explicit arrival rate congestion samplers that are triggered by new arrivals.

Congestion points include a buffer, typically assumed to be a FIFO queue, which acts as a rate mismatch integrator. The congestion level of the buffer is determined by packet arrivals and the service times of the packets leading to departures. The buffer accumulates the difference between the arrivals and the departures of the aggregate flow. Once the congestion point determines that there is congestion in the buffer, the congestion point randomly samples arriving packets and sends congestion notification messages to the traffic sources of the sampled packets.

Accordingly, a data flow with a higher arrival rate at the congestion point is likely to be sampled more often than one with a lower arrival rate. The congestion management system throttles the transmission rate of the data flows having higher arrival rates to the congestion point more than data flows having lower arrival rates. However, the arrival rate of a data flow is not necessarily indicative of its relative contribution to the congestion.

SUMMARY

According to one embodiment of the present disclosure, a method for hierarchical occupancy based congestion management includes receiving, by a computing device, a plurality of data flows, each of the plurality of data flows is received from a source and includes a plurality of data packets and storing the plurality of data packets in a buffer including multiple storage units. The method includes determining if the buffer is congested, responsive to determining the buffer is congested randomly selecting at least two occupied units of the buffer and identifying a source of each of the data packets stored in the occupied units of the buffer and generating a congestion notification message. The method also includes comparing a selection criterion associated with each identified source to determine which identified source has a higher selection criterion and sending the congestion notification message to the identified source with the higher selection criterion.

According to yet another embodiment of the present disclosure, a method for hierarchical occupancy based congestion management includes receiving, by a computing device, a plurality of data flows, each of the plurality of data flows is received from a source and includes a plurality of data packets and storing the plurality of data packets in a buffer including multiple storage units. The method includes determining if the buffer is congested and responsive to determining the buffer is congested randomly selecting an occupied unit of the buffer and identifying a source the data packet stored in the occupied unit of the buffer. The method also includes generating a congestion notification message, comparing a selection criterion associated with the identified source with the selection criteria associated with the source associated with a last throttled data flow to determine which has a higher selection criterion and sending the congestion notification message to the source with the higher selection criterion.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
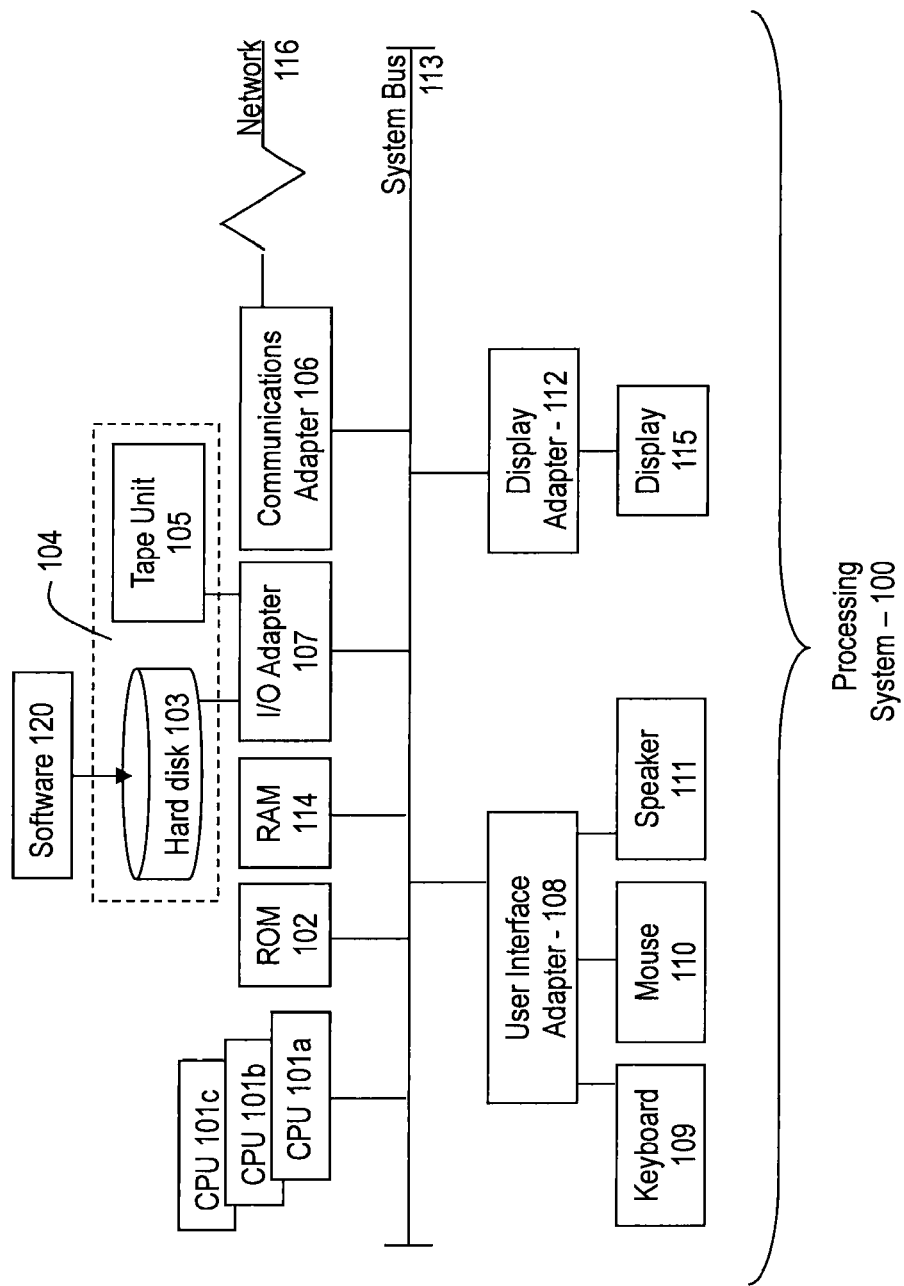
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. Hard disk 103, and tape storage device 105 are collectively referred to herein as mass storage 104. Software 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

A common congestion-control method for Converged Enhanced Ethernet networks is Quantized Congestion Notifications (QCN), which is supported by a large number of network equipment vendors. Implementations of QCN can be found in modern network interface cards (NICs). NICs supporting QCN, which implement reaction points and thus per-flow rate limiters at the source, throttle the transmission rate of a flow in response to the flow receiving congestion notification messages from congestion points in the network. In order to close the congestion control feedback loop, companies that build proprietary or commodity switching systems supporting QCN will implement congestion points at locations in their switching fabrics that need to share a queue or buffer among a plurality of flows. The present invention also pertains to QCN congestion points that may advantageously be provided in the NIC receive path for managing shared queues or buffers for a plurality of flows.

A congestion control function can be implemented by using QCN congestion point functions at the buffers located at the entry points of a multistage switching fabric. Within these fabric-input buffers, modern switching fabrics implement virtual-output-queues (VOQs), where data flows are segregated based on their destination, or class of service, and their departures are being scheduled on a per-flow basis, for example, based upon the availability of downstream buffer locations, the priorities assigned to the flows, or flow-dependent bandwidth constraints. Traditionally, the congestion control functions used a per-flow discriminative flow control between the fabric and the upstream sources that assumed a separate fabric-input buffer to be statically allocated per flow.

A congestion point mechanism capable of identifying congestive flows and then selectively throttling them can be installed in a shared buffer of the congestion point. Congestive flows are those having a greater arrival rate than departure rate at the congestion point, hence building a backlog. In the case of QCN, throttling is realized by sending congestion notification messages to the reaction points at the sources of the offensive flows.

In congestion control schemes like QCN, each feedback control loop includes a congestion point, the buffer where congestion is detected, and the reaction points, which control the maximum sending rate of flows. When a flow causes congestion at a congestion point, the congestion point will send congestion notification messages to the corresponding reaction point telling it to decrease the sending rate of that flow. Sampling at the congestion point may be triggered either periodically or based on a number of arrivals to the congestion point. According to prior art, when a congestion point detects congestion, it sends a congestion notification message to the flow of the currently arriving frame. Effectively, while the congestion point is congested, congestion notification messages are distributed to flows in proportion to their current arrival rates at the congestion point and thus their "present" sending rates. Accordingly, once an arrival rate of a flow is reduced, the rate of new congestion notification messages that are sent to that flow is also reduced.

The buffer usage by a flow is the key metric when sharing a buffer among flows because it affects the ability of other flows to pass through the congestion point. Standard QCN is designed to send congestion notification messages to flows with higher arrival rates to the congestion point. However, the arrival rate of a flow does not sufficiently characterize its contribution to the congestion of the buffer. Instead, the buffer usage by a flow results from integrating the difference between the arrival rate of a flow and its departure rate, i.e., this difference is the rate of change of the buffer usage of the flow.

Figure 2:
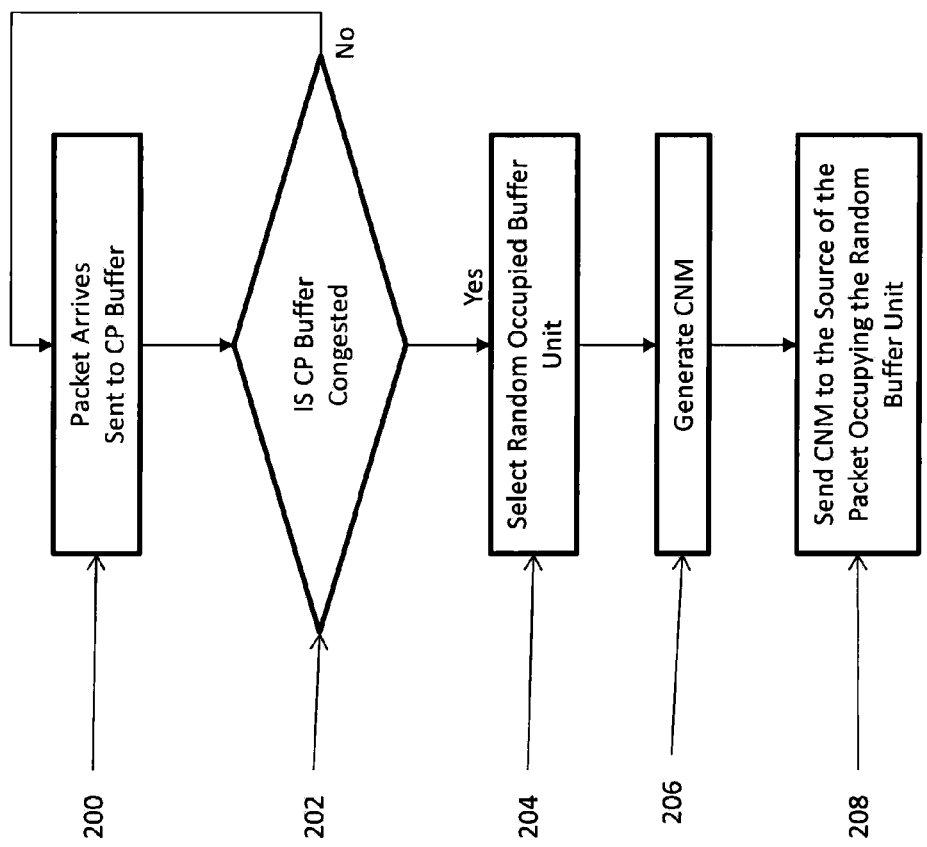
FIG. 2 is a flow chart illustrating a method for buffer occupancy based congestion management in accordance with an embodiment.

Referring now to FIG. 2, a flow chart illustrating a method for buffer occupancy based congestion management is shown. As shown at block 200, a packet is received and stored in the congestion point buffer. At decision block 202, the method includes determining if the congestion point buffer is congested. If the congestion point buffer is congested, a random occupied buffer unit is selected from the congestion point buffer, as shown at block 204. Based on the random occupied buffer unit, a congestion notification message is then generated as shown at block 206. Next, the source of the packet occupying the random buffer unit is determined and the congestion notification message is sent to the identified source, as shown at block 208.

In exemplary embodiments, the chance that a data source receives a congestion notification message is proportional to the percentage of the congestion point buffer that the data source is using. In one embodiment, the process of selecting an occupied buffer unit can include concurrently checking more than one buffer units. If more than one of the buffer units selected is occupied, one of the occupied units is randomly chosen to determine where to send the congestion notification message. As used herein, a buffer unit refers to a fixed-size unit of memory or storage and a packet may be stored in a single or across multiple buffer units. By randomly selecting a buffer unit from a pool of fixed-size buffer units, the probability of selecting a packet associated with a particular flow or data source is given by the fraction of the congestion point buffer utilized by the flow or data source.

In another embodiment, the buffer units may be selectable through an index or global (over all flows) sequence count, which identifies buffer units in the order of packet arrivals. The global sequence count permits the random selection of a flow with a probability that not only increases with the relative buffer occupancy of the flow but also with the age or waiting time of a packet, as the lowest global sequence numbers correspond to the oldest packets.

The congestion level of the congestion point buffer can be sampled periodically or in response to specific triggering events. In one embodiment, the arrival of a new data packet at the congestion point buffer can be used to trigger a calculation of the current congestion level of the buffer. For example, the congestion level of the congestion point buffer can be checked upon the arrival of every n-th packet entering the congestion point buffer. If the congestion point buffer is determined to be congested, then an occupied buffer unit of the congestion point buffer is randomly selected, the header of the corresponding packet is located, a congestion notification message is generated based upon the header of the packet and sent to the source of the packet or frame indicated by the header. In another embodiment, a calculation of the current congestion level of the buffer can be performed on a periodic basis, where the time interval may be constant or may increase and decrease based upon the calculated congestion level. For example, the congestion level may be checked once every hundred microseconds until the congestion level exceeds a threshold value, at which point the time interval can be decreased to a shorter period of time.

In exemplary embodiments, the sampling probability of a data flow is given by the current percentage of congestion point buffer occupancy used by the data flow. For example, if the congestion point buffer holds packets from three flows f1, f2, and f3, which have buffer occupancies as q1, q2, and q3, then a congestion notification message will be sent to the source of f1 with probability $p1=q1/(q1+q2+q3)$. In another example, where two flows f1 and f2 initially contribute equally to the congestion point arrival rate but have different congestion point service rates due an external constraint or flow-selective feedback from downstream network entities, the flows will converge to different throughput values given by their different service rates, i.e., they are no longer both limited to the minimum of these service rates.

One advantage of buffer occupancy based congestion management is that it tends to balance the average fraction of congestion point buffer occupancy used by different flows even if departures from the congestion point buffer are out of order with respect to arrivals, for example, due to flow control from downstream network entities. Another advantage is that the data flows traversing the congestion point buffer at different speeds are not throttled according to their arrival rates but according to their average fraction of congestion point buffer occupancy, which is the resource that the data flows share.

In one example, two data flows are sequentially activated with equal initial arrival rates $\lambda$ and departure rates $\mu$, where $\lambda$ is greater than $\mu$. These flows equally increase congestion point buffer occupancy at the rate $\lambda-\mu$. The first of the two data flows will occupy a larger percentage of the congestion point buffer since it has had more time to accumulate in the congestion point buffer. Accordingly, the first of the two data flows will have a higher probability of being selected for throttling in favor of fairness and stability.

In another example, two flows f1 and f2 have initial, link-rate normalized demand ratios of 0.1 and 0.5, respectively, and service rates of 0.01 and 0.99. The service rates are assumed to be given by an external constraint such as a flow-dependent bandwidth limitation and may be imposed by feedback from downstream network entities. A system with arrival sampling at the congestion point buffer would converge to an approximate rate of ~0.01 for each flow, because the congestion point buffer occupancy would grow and f2 would be sampled more frequently than f1 due to its higher arrival rate at the congestion point buffer. However, the buffer occupancy based congestion management system will throttle only f1 to the 0.01 rate and allows f2 to maintain its 0.5 rate. This is accomplished because the congestion point buffer occupancy contributed by f2 remains close to zero, while the congestion point buffer occupancy contributed by f1 is growing.

Figure 3:
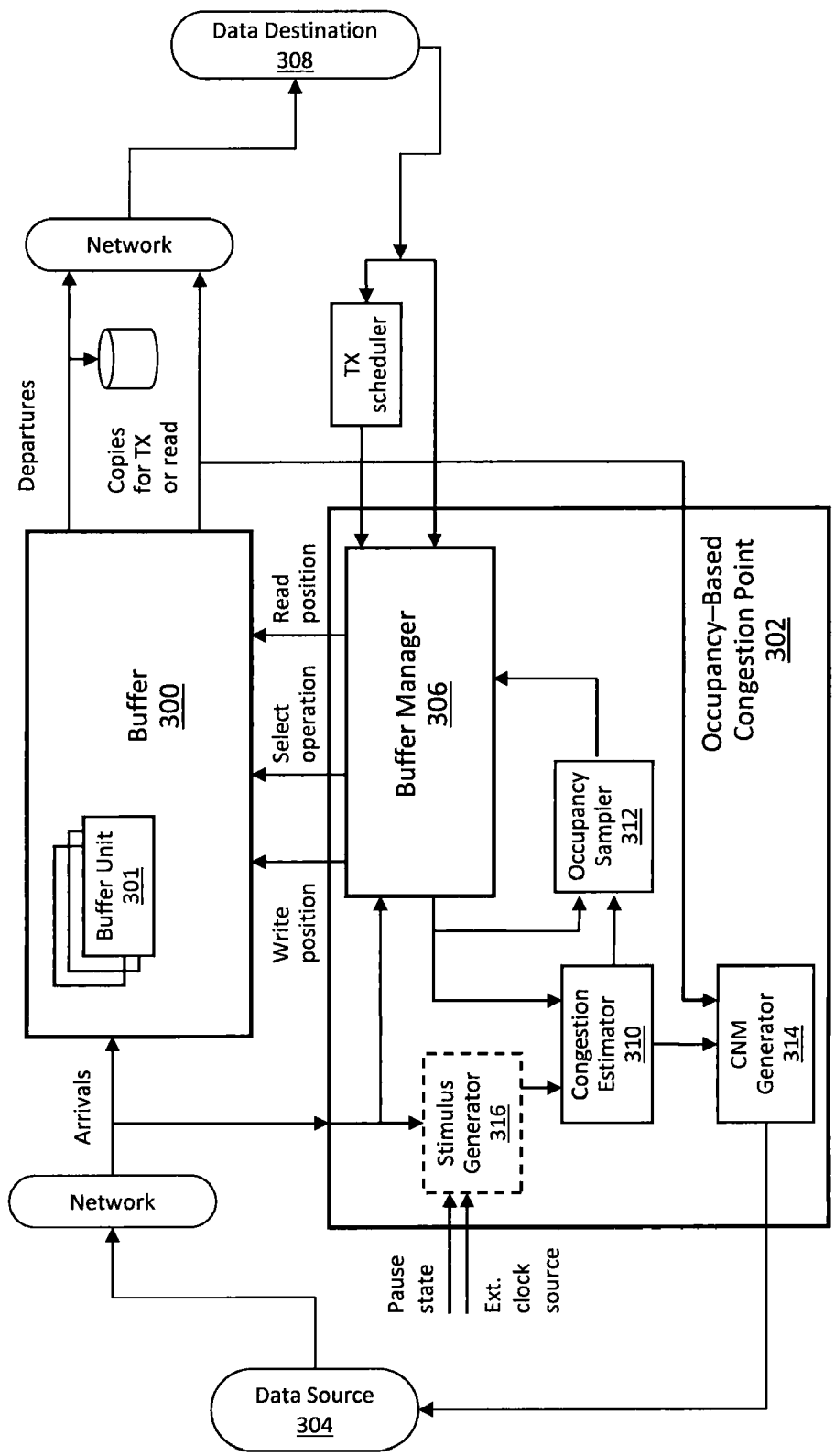
FIG. 3 is a block diagram illustrating a system for buffer occupancy based congestion management in accordance with an embodiment.

Turning now to FIG. 3, a block diagram illustrating a system for buffer occupancy based congestion management in accordance with an exemplary embodiment is shown. The system includes a congestion point buffer 300, an occupancy-based congestion point 302, a data source 304 and a data destination 308. The congestion point buffer 300 includes a plurality of buffer units 301 for storing data packets. The congestion point buffer 300 receives data flows from one or more data sources 304 and sends the data flows to one or more data destinations 308. The occupancy-based congestion point 302 manages the operation of one or more congestion point buffers 300.

The occupancy-based congestion point 302 includes a congestion point buffer manager 306, a congestion estimator 310, an occupancy sampler 312 and a congestion notification message generator 314. In addition, the occupancy-based congestion point 302 may include a stimulus generator 316. The buffer manager 306 stores information about the data packets stored in the congestion point buffer 300. The congestion estimator 310 uses the information stored by the buffer manager 306 to calculate and monitor the level of congestion in the congestion point buffer 300. Once the congestion estimator 310 determines that the congestion in the congestion point buffer 300 has exceeded a threshold value, the occupancy sampler 312 randomly selects one or more occupied buffer units of the congestion point buffer 300 and determines the source of the data stored in the buffer unit 301. The congestion notification message generator 314 sends a congestion notification message to the source of the data stored in the buffer unit 301 selected by the occupancy sampler 312. The congestion notification message is used to instruct the sender to decrease the rate at which it is sending data to the congestion point. The stimulus generator 316 may be used to trigger the congestion estimator 310 to calculate the current congestion level in the congestion point buffer 300 and to generate congestion notification messages at 310 either in response to new arrivals or, during their absence, in an autonomous fashion.

In an exemplary embodiment, data packets received from one or more data sources 304 are stored in multiple fixed-size buffer units 301 of the congestion point buffer 300. The buffer units 301 can be assigned to data packets by the buffer manager 306 from a FIFO queue or free list that includes a record of all empty buffer units 301. The congestion point buffer manager 306 stores information on the usage of buffer units 301 and updates this information whenever new packets are stored in the congestion point buffer 300 or when stored packets are removed from the congestion point buffer 300. The congestion point buffer 300 may transmit the data packets and retain the packet for a period of time. For example, the congestion point buffer 300 may transmit the data packet and retain a copy of the packet until it receives an acknowledgement that the packet was received. Alternatively, the congestion point buffer 300 may be designed to discard the data packet from the buffer after transmitting the packet. In addition, relevant information for packets consuming multiple buffer units 301 is stored by the buffer manager 306 and may include the location of the head buffer unit if a data packet is stored across multiple buffer units 301. If the congestion point buffer 300 covers multiple congestion points, or different priorities stored in a single congestion point buffer 300, the buffer manager 306 also contains information distinguishing the different congestion points, or priorities.

In exemplary embodiments, the congestion estimator 310 determines if the congestion point buffer 300 buffer is congested. If the congestion estimator 310 concludes that a congestion notification message is needed to reduce current or incipient congestion, the occupancy sampler 312 randomly selects a buffer unit 301 from the congestion point buffer 300 and determines the source of the packet in the selected buffer unit 301. If the selected buffer unit 301 is not occupied, or if the buffer unit belongs to a packet that doesn't match additional search criteria, or—in case of multiple congestion points/priorities using a shared buffer—if the data stored in the buffer unit belongs to a wrong congestion point/priority, the search is continued until an occupied buffer unit 301 or a buffer unit 301 matching the search criteria is found. Once a suitable buffer unit 301 has been found, information from the buffer manager 306 is used to identify the traffic source of the data stored in the selected buffer unit 301. A corresponding congestion notification message is then sent to the identified source by the congestion notification message generator 314.

The occupancy sampler 312 can increase the speed of its search for an occupied buffer unit 301 by searching multiple buffer units 301 concurrently. In some cases, the occupancy sampler 310 may be prone to select a flow with lower or higher probability based on the way the packets of the data flow are clustered in physical buffer units 301. In exemplary embodiments, to avoid any bias in selecting a data flow by the occupancy sampler 310, the occupancy sampler 310 concurrently checks buffer units 301 that are physically separated by m buffer units, where m is chosen much larger than the number of buffer units 301 concurrently checked. Since buffer assignments for multi-buffer frames or flows are made when the packets making up the frame or flow enter the congestion point buffer 300, it is probable that buffer units 301 having data belonging to the same frame or flow are physically adjacent, or clustered, within the congestion point buffer 300. If the distance between the concurrently checked buffer units is larger than the maximum frame or flow size in terms of buffer units 301, then there is a very low probability that multiple buffer units checked concurrently will belong to the same frame or flow. This probability may decrease with increasing distance between physical buffer units. Moreover, multiple executions of the concurrent search will experience randomly distinct patterns of buffer usage. Long term, the associated averaging tends to remove any random unfairness of individual executions.

In exemplary embodiments, the buffer manager 306 of the occupancy-based congestion point 302 may maintain a list of data flows in the congestion point buffer 300. Upon the determination that the congestion point buffer 300 is congested, a flow from this list is selected as a culprit flow, with a probability equal to the percentage of buffer units occupied by the flow. Alternatively, a separate list of flows with a high occupancy may be maintained, and the culprit flow can be selected from that list. In a second step, a packet belonging to the culprit flow is chosen and a congestion notification message is sent to the source of that packet. Like the direct random selection of a packet, this two-step procedure results in preferentially sending congestion notifications to flows with high buffer occupancy.

Generally the two different data flow sampling methods, arrival sampling and buffer occupancy sampling, each relate to distinct potential network congestion. Arrival sampling is a more accurate method of determining congestion on a network link, while buffer occupancy sampling is a more accurate method of determining congestion on the buffer. Arrival sampling attempts to optimize the link utilization assuming the existence of one or more arrival processes caused by multiple flows sharing the link. Buffer occupancy sampling optimizes the utilization of a buffer that is shared by multiple data flows, without making any assumptions about their respective incoming arrival processes. As practical network devices are subjected to both types of congestion, link and buffer, in exemplary embodiments the buffer occupancy based congestion management system may include aspects of both sampling methods.

Figure 4:
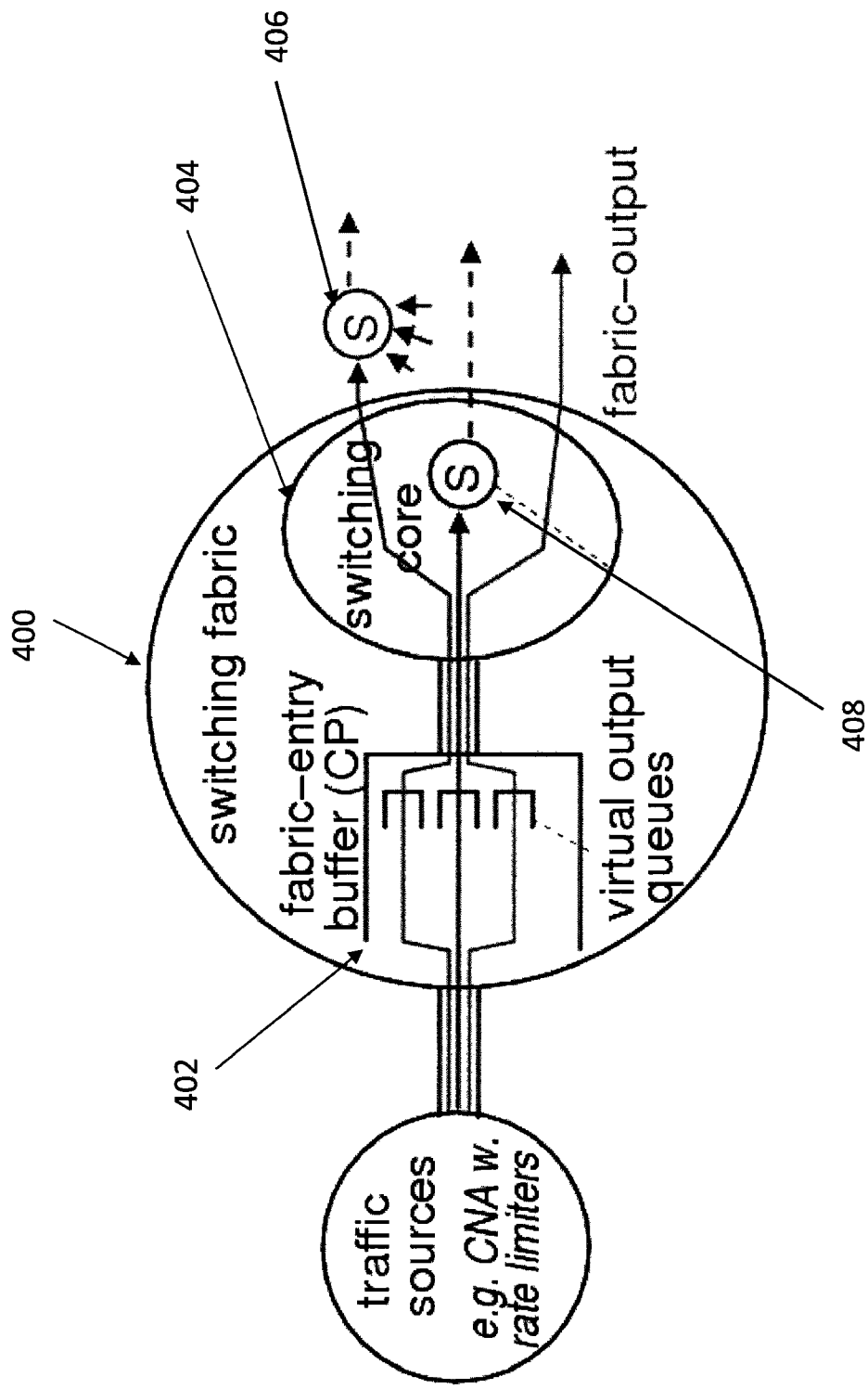
FIG. 4 is a block diagram of a switching fabric that includes a congestion point buffer operable for performing buffer occupancy based congestion management.

Referring now to FIG. 4, an illustration of a switching fabric 400 that includes a fabric-entry buffer 402, or congestion point buffer, and a switching core 404 is shown. Congested data flows through the switching fabric 400 can be categorized as being congested either at a switching fabric output 406 or a switching fabric-internal link 408. Data flows that face congestion at a fabric-output 400 will depart from the congestion point buffer 402 slowly, at a rate dictated by an arbiter which allocates the bandwidth of the fabric-output 406. Therefore, congested switching fabric output flows build backlogs at the fabric-entry buffer 402, which results in more congestion notification messages being generated for these flows under a buffer occupancy sampling method.

Data flows that are congested at a fabric-internal link 408 of the switching core 404 are not constrained at the fabric-output 406 and receive fabric output credits/grants at full speed. However, because the data flows are congested at a fabric-internal link 408, these flows build backlogs in front of the internal link and effectively induce the formation of congestion trees. Depending on their severity, these congestion trees may reach the fabric-entry buffer 402 and constrain the progress of all packets entering the switching fabric 400, whether they pass through the congested internal link 408 or not. In this case, buffer occupancy sampling may not be able to properly identify the flows that are responsible for the congestion tree, since the departure rate of all flows is dictated by the rate that the congested internal links drain packets, hence all flows may build similar backlogs.

Figure 5:
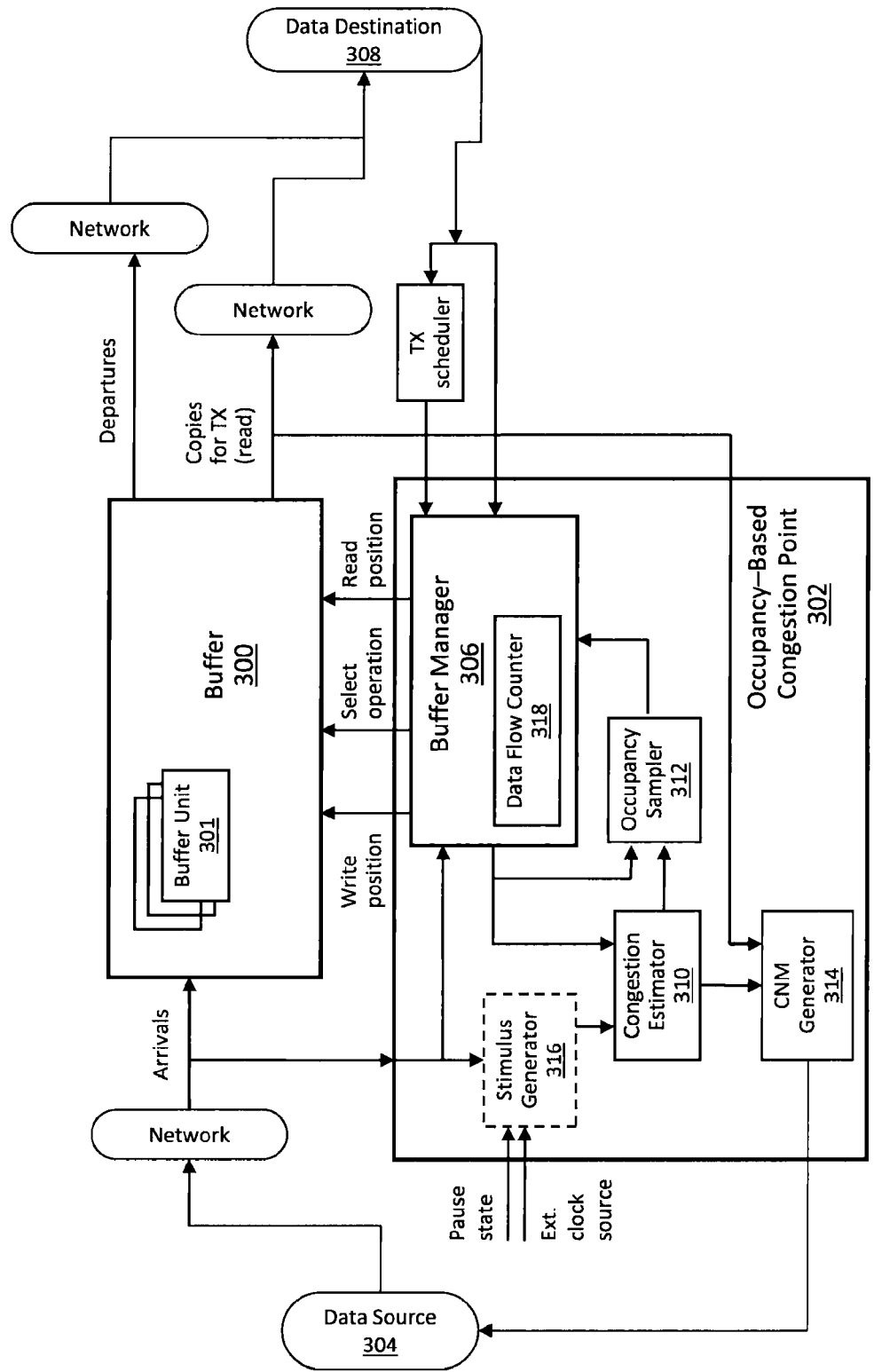
FIG. 5 is a block diagram illustrating a system for hybrid arrival-occupancy based congestion management in accordance with an embodiment.

Referring now to FIG. 5, a block diagram illustrating a system for hybrid arrival-occupancy based congestion management in accordance with an exemplary embodiment is shown. In an exemplary embodiment, the buffer manager 306 of the occupancy based-congestion point 302 includes a (per-flow) recent arrivals counter 318. The recent arrivals counter 318 may be interpreted as a penalty counter. The recent arrivals counter 318 of a flow, which includes packets from one or more data sources 304, is increased with every new arrival at the congestion point buffer 300 of a data packet belonging to the flow. The recent arrivals counter 318 is decreased every time that a new congestion notification message is sent to a source of the corresponding data flow. In one embodiment, the recent arrivals counter 318 can be increased and decreased by a value that is proportional to the size of the data packet that arrives or based upon the severity of the congestion notification message sent. The recent arrivals counter 318 can be set to have predefined upper and lower bounds. In exemplary embodiments, the recent arrivals counter 318 is initially set to zero and may have a lower bound of zero. In another embodiment, the recent arrivals counter 318 can be increased by one with each new data packet that arrives at the congestion point buffer 300 and decreased by one with every new congestion notification message that is sent.

Figure 6:
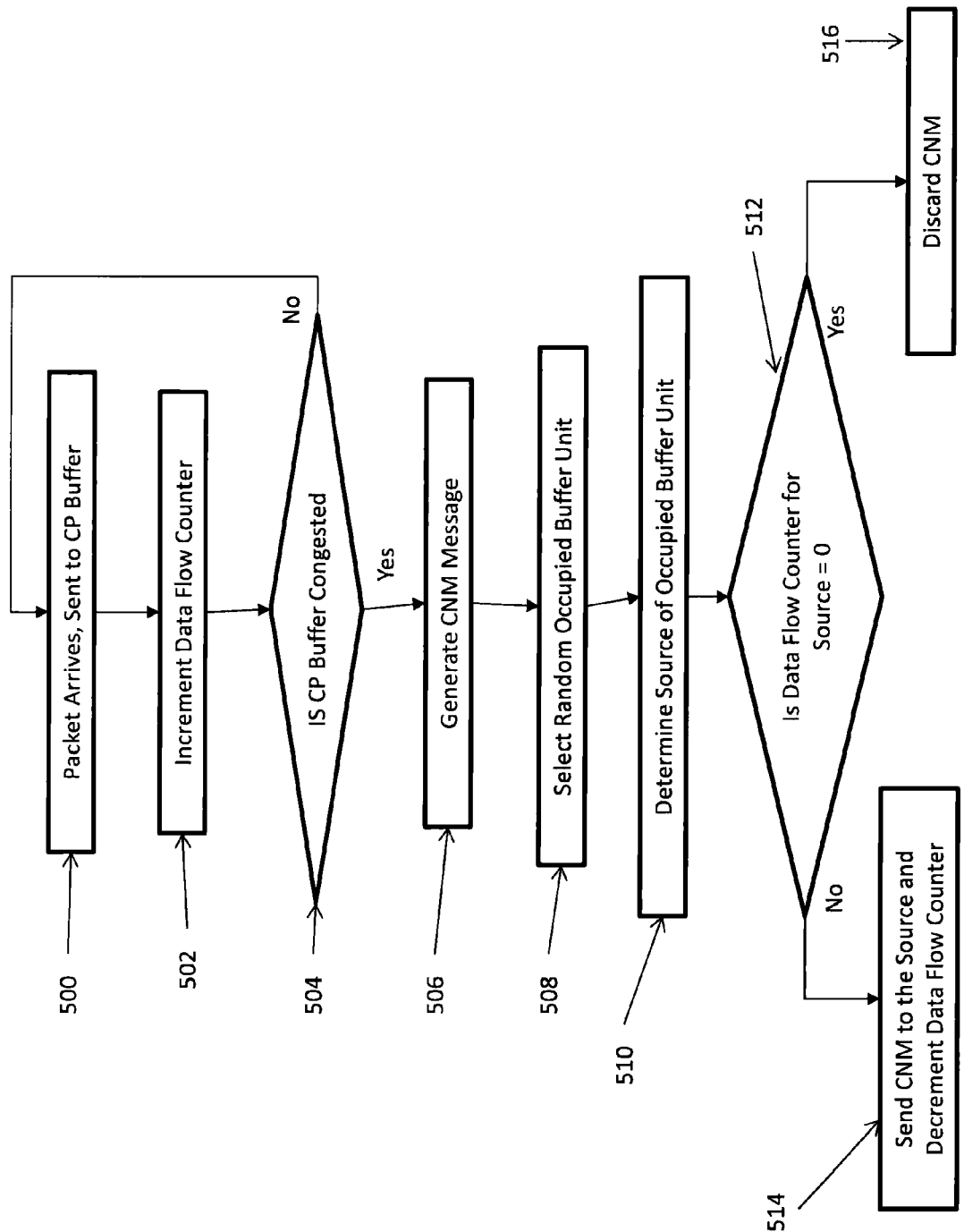
FIG. 6 is a flow chart illustrating a method for hybrid arrival-occupancy based congestion management in accordance with an embodiment.

Referring now to FIG. 6, a flow chart illustrating a method for hybrid arrival-occupancy based congestion management in accordance with an exemplary embodiment is shown. As shown at block 500, a packet is received and stored in the congestion point buffer. At block 502, the recent arrivals counter for the data flow corresponding to the received packet is incremented. Next, as shown at decision block 504, the method includes determining if the congestion point buffer is congested. If the congestion point buffer is congested, a congestion notification message is generated, as shown at block 506. Once the congestion notification message has been generated, a random occupied buffer unit is selected from the congestion point buffer, as shown at block 508. Next, the source of the packet occupying the random buffer unit is determined, as shown at block 510. As shown at decision block 512, the method includes determining if the recent arrivals counter for the data flow associated with the source of the data packet stored in the selected occupied buffer unit is equal to zero. If the recent arrivals counter is not equal to zero, a congestion notification message is sent to the source of the data packet and the recent arrivals counter is decremented, as shown at block 514. Otherwise, the congestion notification message is discarded, as shown at block 516.

In exemplary embodiments, the use of the recent arrivals counter ensures that the data flow that is selected to be throttled has had recent arrival activity and protects against over-throttling a data flow. For example, if a data flow is inactive and has not had recent arrival activity it is likely that its recent arrivals counter will have a zero value and if the data flow is randomly selected for throttling the zero value recent arrivals counter will prevent a congestion notification message from being sent to the inactive data flow. In another example, an active data flow has had recent arrival activity and its recent arrivals counter has a non-zero value. If the buffer experiences congestion and the active data flow is selected for throttling, the recent arrivals counter will be decreased each time a congestion notification message is sent to the data flow. Assuming the active data flow is repeatedly selected for throttling, the upper bound of the recent arrivals counter will prevent the active data flow from being over throttled.

Figure 7:
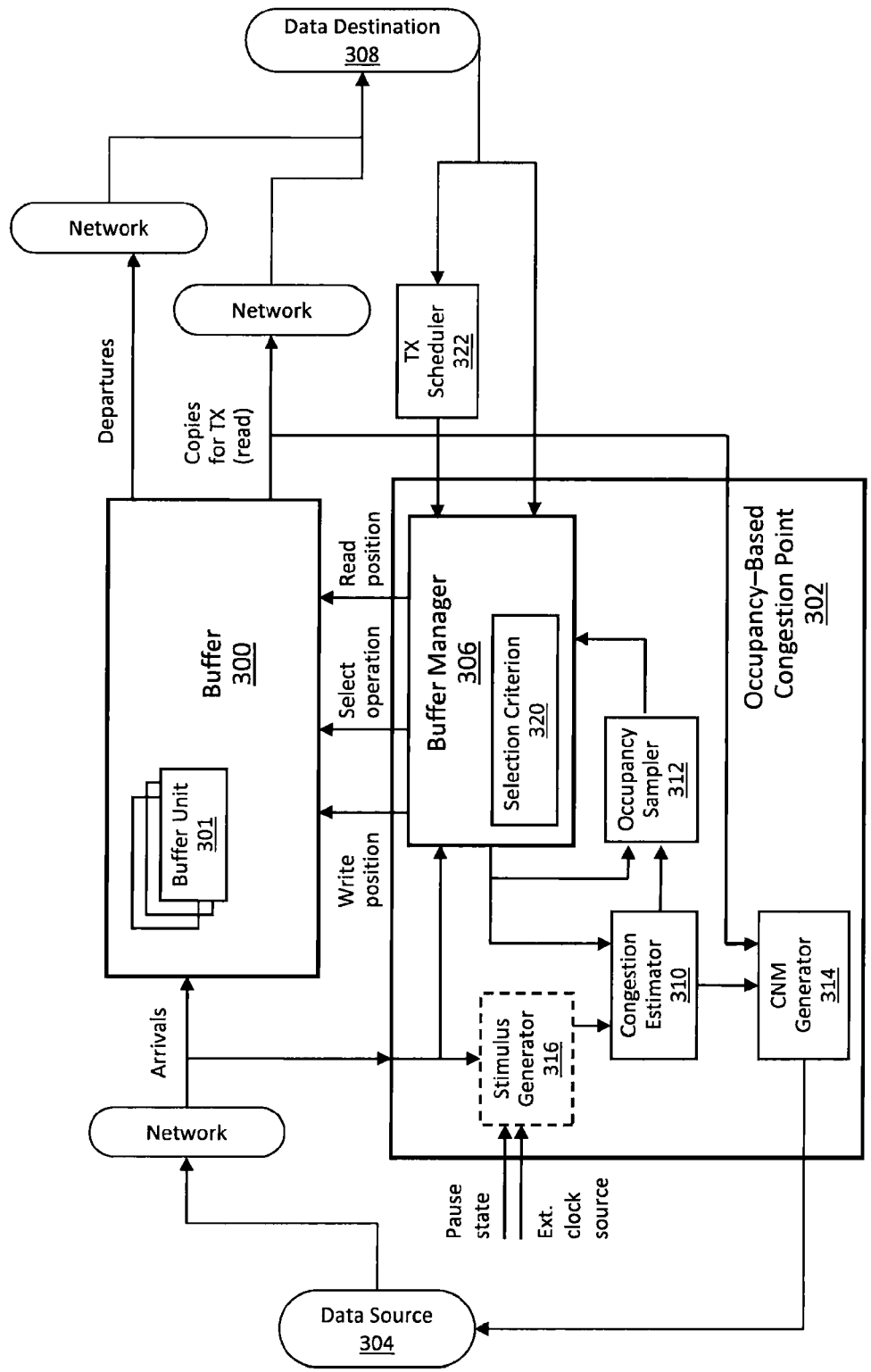
FIG. 7 is a block diagram illustrating a system for hierarchical occupancy-based congestion management in accordance with an embodiment.

Referring now to FIG. 7, a block diagram illustrating a system for hierarchical occupancy-based congestion management is shown. In an exemplary embodiment, the buffer manager 306 of the occupancy based-congestion point 302 includes selection criterion 320. The selection criterion 320 can be used to select which data flows should receive congestion notification messages. In one embodiment, a set of at least two data flows at the congestion point buffer 300 are selected using buffer occupancy sampling. The buffer manager 306 then uses the selection criteria to select which of the at least two identified flows to throttle. In exemplary embodiments, the selection criterion can be based on the filling level of an internal fabric buffer, and data flows that pass through congested internal links will be identified and have a higher probability of being sent congestion notification messages.

In exemplary embodiments, the selection criterion 320 is a congestion index that is associated with each data flow. The congestion index is a variable that is used to rank the relative congestion that each data flow is experiencing. In one embodiment, the congestion index can be a value proportional to occupancy of a downstream buffer in the path of the data flow, the buffer manager 306 may receive this information from the data destination 308 or from a transmission scheduler 322. For example, the fabric-output may communicate a congestion index which reflects its buffer occupancy to the fabric-entry buffer congestion point, which the occupancy-based congestion point 302 uses to select which flow to throttle. In another embodiment, the congestion index of a data flow can be a value proportional to occupancy of the congestion point buffer 300. By using a congestion index in addition to buffer occupancy sampling the congestion management system can identify internally-congested flows, while maintaining the advantages of random-based occupancy-based sampling.

Figure 8:
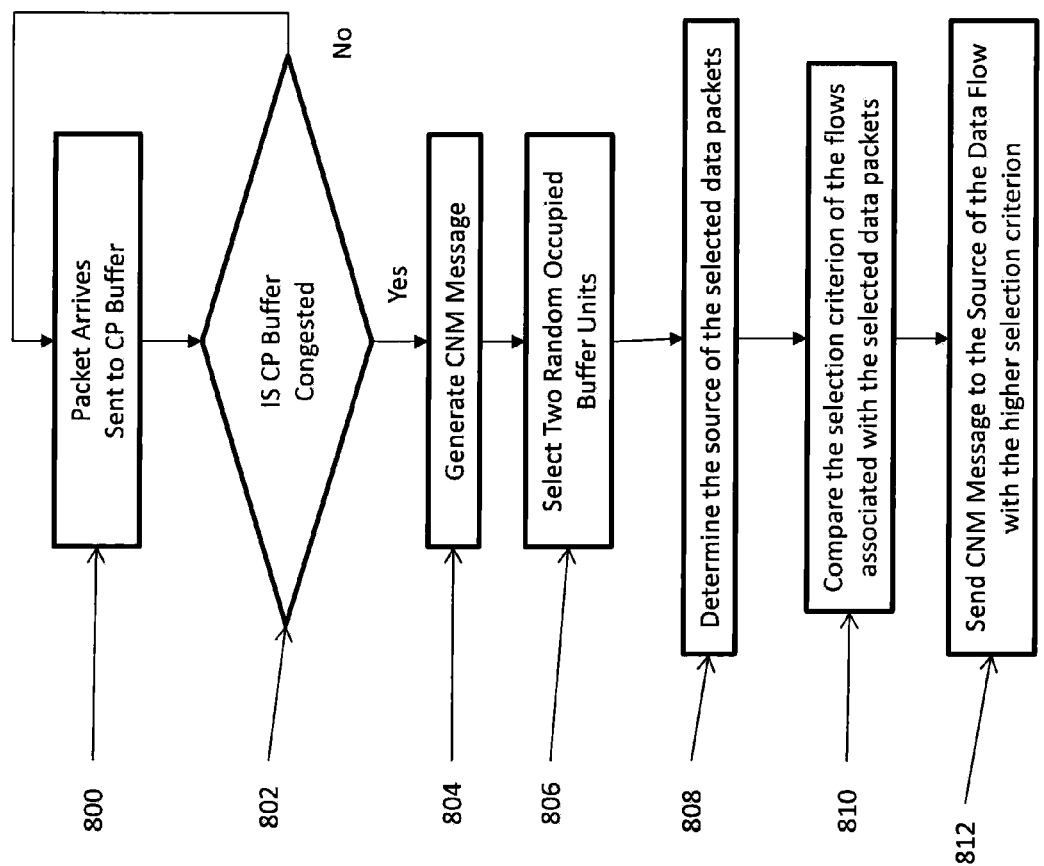
FIG. 8 is a flow chart illustrating a method for hierarchical occupancy-based congestion management in accordance with an embodiment.

Referring now to FIG. 8, a flow chart illustrating a method for hierarchical occupancy-based congestion management is shown. As shown at block 800, a packet is received and stored in the congestion point buffer. Next, at shown at decision block 802, the method includes determining if the congestion point buffer is congested. If the congestion point buffer is congested, a congestion notification message is generated, as shown at block 804. Once the congestion notification message has been generated at least two random occupied buffer units are selected from the congestion point buffer, as shown at block 806. Next, the sources of the packets occupying the random buffer units are determined, as shown at block 808. Once the sources of the at least two data packets are determined, the selection criteria of the at least two data flows are compared, as shown at block 810. The congestion notification is then sent to the source of the data flow with the greater of the two selection criteria, as shown at block 812. In exemplary embodiments, if the at least two randomly selected buffer units contain data associated with the same data flow, additional random sampling of the buffer units may be performed or the congestion notification message may be sent to the common source of the at least two selected buffer units.

In one embodiment, once the at least two occupied buffer units have been have been randomly sampled and their associated data flows have been identified, the route of each of these at least two data flows is determined. If a data flow is destined to a separate node from the current congestion point, the congestion index is set to the occupancy of the downstream buffer in front of the distant link connecting to the targeted node. If a data flow is heading to another node within the same current congestion point, the congestion index is set to the buffer occupancy in front of the local link going to the destination hub. The congestion notification message is then sent to the data flow with higher congestion index.

In another embodiment, the congestion point selects at least two data flows by randomly sampling the congestion point buffer 300 for at least two occupied buffer units and finding the source data stored in the at least two buffer units 301. The congestion index for each flow is set to the buffer occupancy level at the congestion point buffer 300 and the congestion notification message is sent to the flow with higher congestion index. In this way, the accuracy of random selection in implementing occupancy-based sampling is improved. With standard random selection from the congestion point buffer, there is always the chance that a flow which is utilizing a small percentage of the buffer is selected. By randomly selecting at least two occupied buffer units to sample and then intelligently selecting between them, the accuracy of random-selection occupancy sampling can be increased.

In an exemplary embodiment, the buffer manager 306 of the occupancy-based congestion point 302 may save an identification associated with the last data flow that was throttled for future use in identifying which data flow to throttle. Upon the detection of congestion in the congestion point buffer, one or more data flows are selected by randomly sampling the congestion point buffer and the congestion index of the selected data flows is compared to the congestion index of the last data flow throttled. A congestion notification message is then sent to either one of the randomly sampled data flows, or the last throttled flow, based upon which data flows has higher congestion index. In this way, we can progressively identify and throttle the flow with the highest buffer occupancy, and avoid throttling flows with low occupancy.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated While the preferred embodiment to the disclosure had been described, it will be understood that those skilled in the art, both now and in the future, may make various improvements and enhancements which fall within the scope of the claims which follow. These claims should be construed to maintain the proper protection for the disclosure first described.

What is claimed is:

1. A method, comprising:
    receiving, by a processing system, a plurality of data flows, each of the plurality of data flows are received from a source and comprise a plurality of data packets;
    storing the plurality of data packets in a buffer comprising multiple storage units;
    determining if the buffer is congested;
    responsive to determining the buffer is congested randomly selecting at least two occupied units of the buffer and identifying a source of each of the data packets stored in the occupied units of the buffer, wherein the random selection is proportional to a relative occupancy percentage of the buffer associated with a data flow;
    based on a determination that the source of each of the data packets stored in the occupied units of the buffer is common, performing additional random sampling of the buffer units;
    generating a congestion notification message;
    comparing a selection criterion associated with each identified source to determine which identified source has a higher selection criterion, wherein the selection criterion is set to an occupancy of a downstream buffer in front of a distant link connecting to a targeted node if the data flow is destined for a separate node from a current congestion point and wherein the selection criterion is set to a buffer occupancy in front of a local link going to a destination hub if the data flow is destined for another node within the current congestion point; and
    sending the congestion notification message to the identified source with the higher selection criterion.

2. The method of claim 1, wherein the selection criterion is a congestion level of a downstream link in a path of the data flow.

3. The method of claim 1, wherein the selection criterion is an averaged congestion level of a plurality of downstream links in a path of the data flow.

4. The method of claim 1, wherein the congestion notification message instructs the source to reduce its data transmission rate.

5. The method of claim 1, wherein determining if the buffer is congested is triggered by an arrival of data packet at the buffer.

6. The method of claim 1, wherein determining if the buffer is congested is done on a periodic basis.

* * * * *